United States Patent
Zischka et al.

(10) Patent No.: US 11,554,745 B2
(45) Date of Patent: Jan. 17, 2023

(54) AIRBAG MODULE AND METHOD FOR INSTALLING A GAS GENERATOR IN AN AIRBAG

(71) Applicants: TRW AUTOMOTIVE GMBH, Alfdorf (DE); AUDI AG, Ingolstadt (DE)

(72) Inventors: Gerd Zischka, Schwäbisch Gmünd (DE); Marco Wahl, Sulzbach-Laufen (DE)

(73) Assignees: ZF AUTOMOTIVE GERMANY GMBH, Alfdorf (DE); AUDI AG, Ingolstadt (DE)

( * ) Notice: Subject to any disclaimer, the term of this patent is extended or adjusted under 35 U.S.C. 154(b) by 104 days.

(21) Appl. No.: 17/281,279

(22) PCT Filed: Oct. 1, 2019

(86) PCT No.: PCT/EP2019/076509
§ 371 (c)(1),
(2) Date: Mar. 30, 2021

(87) PCT Pub. No.: WO2020/070090
PCT Pub. Date: Apr. 9, 2020

(65) Prior Publication Data
US 2022/0001825 A1    Jan. 6, 2022

(30) Foreign Application Priority Data

Oct. 2, 2018    (DE) ..................... 10 2018 124 371.5

(51) Int. Cl.
*B60R 21/217*    (2011.01)
*B60R 21/231*    (2011.01)
(52) U.S. Cl.
CPC .... *B60R 21/2171* (2013.01); *B60R 21/23138* (2013.01); *B60R 2021/23146* (2013.01)

(58) Field of Classification Search
CPC ................................................ B60R 21/2171
See application file for complete search history.

(56) References Cited

U.S. PATENT DOCUMENTS

| 6,371,518 B1 | 4/2002 | Kalandek et al. |
| 8,196,952 B2 | 6/2012 | Walston et al. |
| (Continued) | | |

FOREIGN PATENT DOCUMENTS

| DE | 102005042313 A1 | 3/2006 |
| EP | 1273486 A2 | 1/2003 |
| EP | 1852317 A1 | 11/2007 |

OTHER PUBLICATIONS

PCT International Search Report for corresponding International Application Serial No. PCT/EP2019/076509, dated Dec. 3, 2019, pp. 1-4.

*Primary Examiner* — Karen Beck
(74) *Attorney, Agent, or Firm* — Tarolli, Sundheim, Covell & Tummino LLP

(57) ABSTRACT

An airbag module (10) comprises an airbag (14) and an elongate inflator (12) having at least one laterally projecting fastening bolt (36), wherein the airbag (14) comprises a cushion portion (24) and an insertion portion (26) for receiving the inflator (12) in an inserting direction (R), wherein the insertion portion (26) is arranged, with the airbag (14) being not inflated and flatly spread, on a side of the cushion portion (24) and includes one boundary (30) close to the cushion portion (24) and one boundary (32) remote from the cushion portion (24). The flatly spread airbag (14) has a front peripheral portion (20) and an opposed rear peripheral portion (22). The insertion portion (26) is wider than a diameter (d) of the inflator (12) and has at least one hole (38) for the fastening bolt (36) of the inflator (12) to pass through. The insertion portion (26) is angled toward the insertion opening (28) on the side remote from (Continued)

the cushion portion (24) opposed to the adjacent rear peripheral portion (22).

11 Claims, 2 Drawing Sheets

(56) References Cited

U.S. PATENT DOCUMENTS

| | | |
|---|---|---|
| 2003/0006587 A1* | 1/2003 | Jang ................. B60R 21/231 |
| | | 280/730.2 |
| 2010/0140906 A1 | 6/2010 | Honda et al. |
| 2010/0225098 A1 | 9/2010 | Baumgartner et al. |
| 2013/0015640 A1 | 1/2013 | Lusk et al. |

* cited by examiner

AIRBAG MODULE AND METHOD FOR INSTALLING A GAS GENERATOR IN AN AIRBAG

RELATED APPLICATIONS

The present invention is a U.S. National Stage under 35 USC 371 patent application, claiming priority to Serial No. PCT/EP2019/076509, filed on 1 Oct. 2019; which claims priority from 10 2018 124 371.5, filed 2 Oct. 2018, the entirety of both of which are incorporated herein by reference.

TECHNICAL FIELD

The invention relates to an airbag module comprising an airbag and an elongate inflator that includes at least one laterally projecting fastening bolt. The invention further relates to a method for mounting an inflator in an airbag.

BACKGROUND

In different types of airbag modules, especially those that are mounted as side airbag in a seat back of a vehicle seat, the inflator is partially inserted into the airbag, and the airbag is fastened around the outer housing of the inflator. A secure connection between the inflator and the airbag is guaranteed by one or more fastening bolts which project laterally from the inflator and which protrude through holes in the airbag. The entire airbag module is tightly fixed to the vehicle via said fastening bolts.

Due to said fastening bolts projecting from the inflator, the insertion opening in the airbag through which the inflator is inserted into the airbag must be wider than the diameter of the actual outer housing of the inflator. The gas tightness required then is produced by gathering the material around the insertion opening. In doing so, tensile stresses may occur which might affect positioning of the airbag in the inflated state.

SUMMARY

It is the object of the invention to improve the position stability of an airbag of an afore-described airbag module.

For achieving this object, an airbag module comprising the features of claim 1 is provided. The airbag module includes an airbag and an elongate inflator having at least one laterally projecting fastening bolt. The airbag includes a cushion portion that serves to absorb a vehicle occupant and an insertion portion for receiving the inflator in an inserting direction, the insertion portion being in fluid communication with the cushion portion. The insertion portion is arranged, with a non-inflated flatly spread airbag, on one side of the cushion portion and includes one boundary close to the cushion portion and one boundary remote from the cushion portion. The flatly spread airbag has a front peripheral portion and an opposed rear peripheral portion. The insertion portion is wider than a diameter of the inflator and includes at least one hole for the fastening bolt of the inflator to pass through. The insertion portion begins at the periphery of the airbag at an insertion opening. The insertion portion is angled toward the insertion opening on the side remote from the cushion portion opposite to the adjacent rear peripheral portion so that especially the insertion portion widens toward the insertion opening.

The excess material required to insert the inflator including its fastening bolts into the insertion portion is thus provided, according to the invention, on the side of the airbag facing away from the cushion portion, rather than, as previously common, on the side close to the cushion portion. Therefore, when fastening the inflator within the airbag, the side of the insertion portion remote from the cushion portion can be gathered. This results in the fact that the geometry of the airbag on the side close to the cushion portion is at most insignificantly changed, consequently the boundary of the insertion portion close to the cushion portion is not or not substantially deformed and, thus, on that side, no tensile forces are occurring which might affect the positioning of the inflated airbag. Therefore, especially tilting of the cushion portion of the airbag toward the inflator is avoided. The invention helps achieve an improved positioning of the airbag in a simple manner during deployment and in the inflated state.

The hole or holes for the fastening bolt or bolts are provided, for example, in the boundary remote from the cushion portion.

Both boundaries of the insertion portion may be provided in a peripheral edge of the airbag, which facilitates fabrication of the airbag.

Accordingly, the insertion portion is provided, as usual, on the side of the airbag that is mounted to the vehicle.

In a top view onto the flatly spread non-inflated airbag prior to fixing the inflator, in a preferred embodiment the boundary of the insertion portion remote from the cushion portion projects from the rear peripheral portion of the airbag adjacent to the insertion portion. The rear peripheral edge is especially the part of the peripheral edge of the airbag that faces, in the mounted and inflated state of the airbag, the seat back of a vehicle seat, whereas the front peripheral portion is located freely in the passenger compartment and forms so-to-speak a front end of the inflated airbag.

Preferably, the airbag is formed of two mirror-image shaped and flatly superimposed cut parts which are interconnected along the peripheral edge of the airbag and which together constitute the outer wall of the airbag. The cut parts can be connected, in a known way, by sewing, weaving or partially even by folding over a one-piece cut part.

The insertion portion is tubular, for example, and is formed by the two boundaries as well as respective superimposed portions of the cut parts.

A width of the insertion portion is defined here in a direction in the plane of the flatly spread airbag perpendicularly to an insertion direction of the inflator into the airbag.

The length of the boundary close to the cushion portion may be selected to be somewhat shorter than the axial length of the inflator so that gas can freely flow out of a gas outlet area at the axial end of the inflator into the interior of the airbag.

The length of the boundary remote from the cushion portion is selected, for example, about as long as the axial length of the inflator so that the latter is retained along its entire length by the wall of the airbag.

In a preferred embodiment, the boundary of the insertion portion remote from the cushion portion is inclined with respect to the rear peripheral portion and encloses an angle ranging from 120° to 170°, for example, with the rear peripheral portion. In order to facilitate fabrication, each of the boundary and the peripheral portion may extend linearly.

In order to fasten the inflator gas-tightly toward the ambience in the airbag, it is favorable when the insertion portion widens toward the insertion opening, and thus the excess material increases in the direction of the insertion opening. The width of the insertion portion perpendicularly to the insertion direction and in the surface area of the flatly spread airbag may continuously increase in the direction of the insertion opening to avoid complicated cutting shapes. The excess material is selected, for example, so that the width of the insertion portion increases by 20% to 150% from the transition thereof into the cushion portion to the insertion opening.

The boundary of the insertion portion close to the cushion portion preferably extends approximately in parallel to the rear peripheral portion, the longitudinal axis of the inflator in the mounted state being parallel to the rear peripheral portion. This allows for folding the airbag without any complex folding operation such that a compact airbag module will form.

Following a known airbag shape, the boundary of the insertion portion close to the cushion portion can simultaneously delimit an indentation in the cushion portion. Since the boundary close to the cushion portion is neither gathered nor otherwise deformed and subjected to tensile stress during assembly of the inflator, no forces that during inflation would pull the airbag in the direction of the inflator are acting on the airbag.

A space between the boundary of the insertion portion close to the cushion portion and an (imaginary) extension of the rear peripheral portion preferably corresponds substantially to the diameter of the inflator (without taking the fastening bolts into account). This corresponds also to the dimensions present in the airbag module after the insertion portion was gathered around the inflator. Basically, the excess material in the insertion portion can also be shown in such a way that the entire airbag material that projects, on the side of the insertion portion remote from the cushion portion, from said imaginary extension of the rear peripheral portion forms excess material which is gathered during assembly of the inflator.

In the case of the inflator mounted in the airbag and the flatly spread airbag, preferably a longitudinal axis of the inflator is in parallel to the boundary of the insertion portion close to the cushion portion. When the airbag module is mounted and the airbag is inflated, therefore the longitudinal axis of the inflator may be approximately in parallel to a vertical axis of the airbag, which corresponds, for example, to a preferred mounting position of airbag modules in the seat back of a vehicle seat.

When the airbag is designed for being mounted on a seat back of a vehicle, the rear peripheral portion should be positioned, in the inflated state of the airbag, in direct vicinity of the seat back. This arrangement is favorable when the inflator is fixed to the frame of the seat back through the fastening bolts. The rear peripheral portion then extends along the seat back above the inflator.

The gastight fixation of the gathered portions of the insertion portion can be easily carried out by the insertion portion being clamped to the periphery of the inflator by a clamp. The clamp extends especially through the indentation and is preferably placed in the area of the insertion opening.

The afore-mentioned object is also achieved by a method for mounting an inflator inside an airbag, the airbag module being configured as afore-described. The inflator is inserted into the insertion portion. The at least one fastening bolt of the inflator is pushed through the hole of the insertion portion. After that, the excess material of the insertion portion is folded around a peripheral wall of the inflator so that the insertion portion abuts on the inflator. In doing so, the boundary of the insertion portion close to the cushion portion is substantially not deformed. This mounting method prevents undesired tensile forces from acting upon the boundary of the insertion portion close to the cushion portion and thus ensures, during inflation of the airbag, the latter to arrive at its desired position.

The excess material is preferably folded in that the inflator is rotated about its longitudinal axis in the direction of the cushion portion and the material of the insertion portion is furled around the inflator. Advantageously, prior to furling, the inflator abuts on the boundary remote from the cushion portion. This type of gathering produces fewer creases and thus a higher gas tightness than zigzag folding, for example. Of course, also a different type of gathering would be imaginable.

The excess material is advantageously furled until the inflator is tightly placed in the insertion portion. Subsequently, while maintaining said produced bias, the airbag is fixed to the inflator, for example by a known clamp.

BRIEF DESCRIPTION OF THE FIGURES

In the following, the invention shall be described in detail by way of an embodiment and with reference to the attached Figures, wherein.

DETAILED DESCRIPTION

Figure 1:
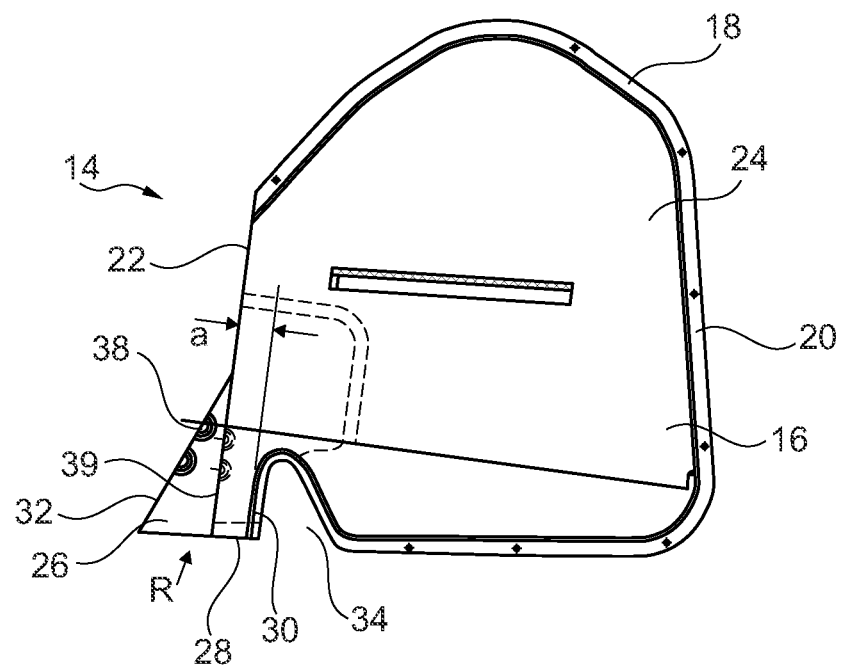
FIG. 1 shows a schematic view of a flatly spread airbag of an airbag module according to the invention.

FIGS. 1 to 4 illustrate a sequence of steps to fasten in an airbag module (10) (see FIG. 4) an inflator 12 (see FIGS. 2 to 4) inside an airbag 14.

In this example, the airbag 14 can be flatly spread and is substantially composed of two mirror-image cut parts 16 which are precisely superimposed and thus form a two-ply wall that encloses an inflatable inner volume of the airbag 14. The two cut parts 16 are interconnected gas-tightly along a peripheral edge 18.

The Figures illustrate the airbag 14 so that the peripheral edge 18 is shown in a top view.

In this example, the airbag module 10 is intended to be mounted to the seat back of a vehicle seat (not shown). The peripheral edge 18 of the airbag 14 therefore has a front peripheral portion 20 which, in the mounted state of the airbag module 10 and with the airbag 14 being inflated, forms so-to-speak a front end of the airbag 14 that is located freely in the passenger compartment. Moreover, the peripheral edge 18 has a rear peripheral portion 22 which, in the state mounted on the vehicle, is disposed close to a seat back of the vehicle seat.

The major part of the surface area of the airbag 14 as well as the major part of the inflatable inner volume is occupied by a cushion portion 24 that serves to absorb a vehicle occupant.

The cushion portion 24 is fluid-communicated with an insertion portion 26 which merges into an insertion opening 28 at the peripheral edge 18 of the airbag 14. The insertion portion 26 can also be flatly spread and includes a boundary 30 close to the cushion portion 24 as well as, on the opposite side, a boundary 32 remote from the cushion portion 24. Perpendicularly to the plane of the Figures, the insertion portion 26 is terminated by the two cut parts 16 of the airbag 14. The insertion portion 26 is arranged on the side of the cushion portion 24.

The boundary 30 of the insertion portion 26 close to the cushion portion 24 at the same time delimits an indentation 34 which extends into the cushion portion 24, relating to the surface area of the airbag 14, and which separates the main volume of the cushion portion 24 from the insertion portion 26.

In this example, the inflator 12 includes two fastening bolts 36 radially projecting from its outer housing.

Figure 2:
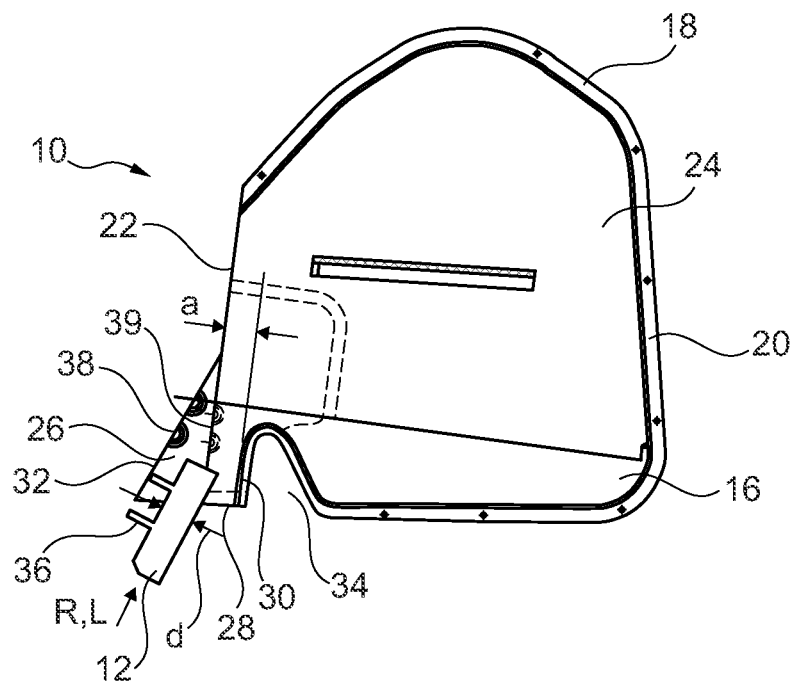
FIG. 2 shows the airbag from FIG. 1 and an inflator of the airbag module according to the invention at the beginning of the assembly of the inflator.

The width of the insertion portion 26 in the plane of the surface area of the airbag 14 and perpendicularly to an insertion direction R along which the inflator 12 is inserted, following its longitudinal axis L, into the insertion portion 26 is selected to be at least as large as a diameter d of the outer housing of the inflator 12 plus the length of the fastening bolts 36 (see also FIG. 2).

The insertion portion 26 has two holes 38, e.g., in the boundary 32 remote from the cushion portion 24, which are adapted to the diameter of the two fastening bolts 36.

On the side remote from the cushion portion 24, the insertion portion 26 is angled toward the insertion opening 28 vis-à-vis the rear peripheral portion 22 adjacent when viewed in the inserting direction R. The boundary 32 remote from the cushion portion 24 extends at an obtuse angle with the rear peripheral portion 22. In this case, the angle ranges from 120° to 170°.

Both the rear peripheral portion 22 and the boundary 32 of the insertion portion 26 remote from the cushion portion 24 extend linearly in this example.

The boundary 30 of the insertion portion 26 close to the cushion portion 24 here extends approximately in parallel to the rear peripheral portion 22 so that, in the direction of the insertion opening 28, the space between the boundary 30 close to the cushion portion 24 and the boundary 32 remote from the cushion portion 24 continuously increases.

A space a in the plane of the spread airbag 14 between an imaginary extension 39 of the rear peripheral portion 22 and the boundary 30 of the insertion portion 26 close to the cushion portion 24 is selected to be about as large as the diameter d of the outer housing of the inflator 12 (without the fastening bolts 36). All of the material that is provided along said imaginary extension 39 of the rear peripheral portion 22 on the side of the insertion portion 26 facing away from the cushion portion 24 constitutes excess material.

For mounting the inflator 12 to the airbag 14, the inflator 12 is inserted along its longitudinal axis L in the insertion direction R through the insertion opening 28 into the insertion portion 26, until a longitudinal end of the inflator 12 provided with a gas outlet area (not shown) protrudes beyond the boundary 30 of the insertion portion 26 close to the cushion portion 24 into the cushion portion 24. For this purpose, the boundary 30 close to the cushion portion 24 is somewhat shorter than the boundary 32 remote from the cushion portion 24. The boundary 32 remote from the cushion portion 24 in this case has about the length of the inflation 12.

The fastening bolts 36 are inserted through the holes 38 in the boundary 32 of the insertion portion 26 remote from the cushion portion 24, until the inflator 12 abuts on the boundary 32 remote from the cushion portion 24 along its entire length.

Figure 3:
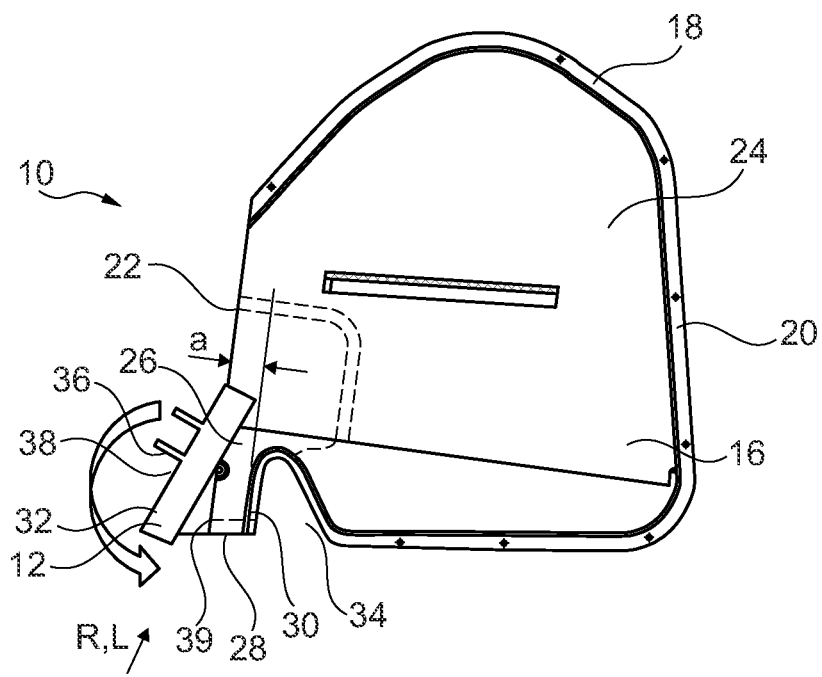
FIG. 3 shows the gathering of the excess material of the insertion portion by furling.

These steps are illustrated in FIGS. 2 and 3.

The insertion portion 26 is now gathered to combine the excess material. In this example, this is done in that, starting from the boundary 32 of the insertion portion 26 remote from the cushion portion 24, the inflator 12 is wrapped in the direction of the cushion portion 24 into the insertion portion 26. In doing so, the material of the insertion portion 26 abuts against the outer wall of the inflator 12.

Upon completion of this step, the longitudinal axis of the inflator 12 is located substantially in parallel to the rear peripheral portion 22 and to the boundary 30 of the insertion portion 26 close to the cushion portion 24. It is substantially not deformed during the gathering of the excess material.

Figure 4:
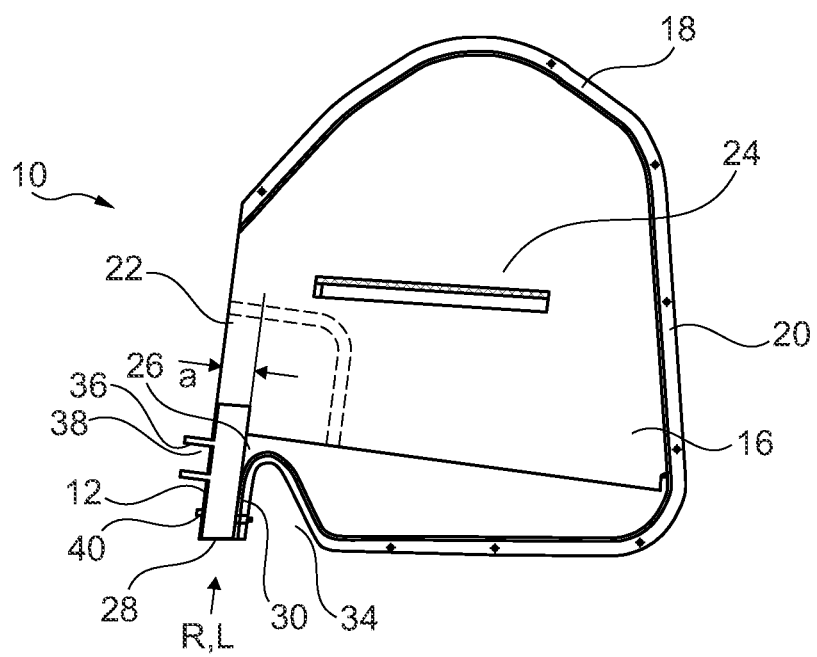
FIG. 4 shows the completely assembled airbag module in which the inflator is fixed on the airbag.

This is illustrated in FIGS. 3 and 4.

So that, after this step, the fastening bolts 36 are later located within the airbag module 10 at the desired position, the holes 38 may also be arranged in one of the cut parts 16 of the airbag 14.

While maintaining the bias of the furled insertion portion 26, now the insertion portion 26 is fixed strongly and substantially gas-tightly by means of a conventional clamp 40 in the vicinity of the insertion opening 28.

It is also possible to gather the excess material in a different way, wherein the boundary 30 close to the cushion portion 24 is not deformed, however.

Now the airbag 14 can be folded as conventionally known and can be installed in a vehicle together with the inflator 12 as a completed airbag module 10.

When the airbag module 10 is mounted in the seat back of a vehicle seat, in the installed state the longitudinal axis of the inflator 12 usually extends along the seat back. In the inflated state of the airbag 14, also the rear peripheral portion 22 usually extends along the seat back.

The invention claimed is:

1. An airbag module (10) comprising an airbag (14) and an elongate inflator (12) having at least one laterally projecting fastening bolt (36), wherein the airbag (14) comprises a cushion portion (24) which serves to absorb a vehicle occupant and an insertion portion (26) for receiving the inflator (12) in an insertion direction (R) which is in fluid communication with the cushion portion (24), wherein, with the airbag (14) being not inflated and flatly spread, the insertion portion (26) is arranged on a side of the cushion portion (24) and includes one boundary (30) close to the cushion portion (24) and one boundary (32) remote from the cushion portion (24), and the flatly spread airbag (14) has a front peripheral portion (20) and an opposed rear peripheral portion (22), and wherein the insertion portion (26) is wider than a diameter (d) of the inflator (12) and has at least one hole (38) for the fastening bolt (36) of the inflator (12) to pass through, wherein the insertion portion (26) begins at the periphery of the airbag (14) at an insertion opening (28), and wherein the insertion portion (26) is angled toward the insertion opening (28) on the side remote from the cushion portion (24) opposed to the adjacent rear peripheral portion (22) so that the insertion portion (26) widens toward the insertion opening (28).

2. The airbag module (10) according to claim 1, wherein the boundary (32) of the insertion portion (26) remote from the cushion portion (24) is inclined with respect to the rear peripheral portion (22) and encloses an angle ranging from 120° to 170° with the rear peripheral portion (22).

3. The airbag module (10) according to claim 1, wherein the width of the insertion portion (26) continuously increases perpendicularly to the insertion direction (R) and in the surface area of the flatly spread airbag (14) in the direction of the insertion opening (28).

4. The airbag module (10) according to claim 1, wherein the boundary of the insertion portion (26) close to the cushion portion (24) extends approximately in parallel to the rear peripheral portion (22).

5. The airbag module (10) according to claim 1, wherein the boundary (30) of the insertion portion (26) close to the cushion portion (24) at the same time delimits an indentation (34) in the cushion portion (24).

6. The airbag module (10) according to claim 1, wherein, in the non-inflated flatly spread state of the airbag (14), a space (a) between the boundary (30) of the insertion portion (26) close to the cushion portion (24) and an extension of the rear peripheral portion (22) substantially corresponds to the diameter (d) of the inflator (12).

7. The airbag module (10) according to claim 1, wherein, with the inflator (12) being mounted in the airbag (14) and the airbag (14) being flatly spread, a longitudinal axis (L) of the inflator (12) is located in parallel to the boundary (30) of the insertion portion (26) close to the cushion portion (24).

8. The airbag module (10) according to claim 1, wherein the airbag (14) is configured for being mounted on a seat back of a vehicle seat, and the rear peripheral portion (22) is positioned, in the inflated state of the airbag (14), in direct vicinity of the seat back.

9. The airbag module (10) according to claim 1, wherein the insertion portion (26) is clamped to the periphery of the airbag (14) by a clamp (40).

10. A method for mounting an inflator (12) inside an airbag (14) in an airbag module (10) according to claim 1, comprising the steps of:
    inserting the inflator (12) into the insertion portion (26),
    pushing the at least one fastening bolt (36) of the inflator (12) through the hole (38) of the insertion portion (26) and
    folding the excess material of the insertion portion (26) about a peripheral wall of the inflator (12) so that the insertion portion (26) abuts against the inflator (12), wherein the boundary (30) of the insertion portion (26) close to the cushion portion (24) is substantially not deformed.

11. The method according to claim 10, wherein the excess material is folded by rotating the inflator (12) about its longitudinal axis (L) in the direction of the cushion portion (24) and furling the material of the insertion portion (26) around the inflator (12).

* * * * *